United States Patent [19]

Suzuki et al.

[11] 4,432,565
[45] Feb. 21, 1984

[54] STEERING ASSEMBLY SUPPORTING DEVICE OF A MOTOR VEHICLE

[75] Inventors: Ichiro Suzuki, Nagoya; Yasushi Nakagawa, Aichi; Naoto Kitagawa, Toyota, all of Japan

[73] Assignee: Toyota Jidosha Kogyo Kabushiki Kaisha, Japan

[21] Appl. No.: 327,639

[22] Filed: Dec. 4, 1981

[30] Foreign Application Priority Data

May 7, 1981 [JP] Japan .............................. 56-65029[U]

[51] Int. Cl.³ .............................................. B62D 1/16
[52] U.S. Cl. ...................................... 280/779; 180/90
[58] Field of Search ........................ 280/779; 180/90; 296/70, 72, 192, 193, 194, 197, 187, 203, 205

[56] References Cited

U.S. PATENT DOCUMENTS

| 2,072,655 | 3/1937 | Tjaarda | 180/90 |
|---|---|---|---|
| 2,253,193 | 8/1941 | Niessen | 296/205 |
| 2,978,055 | 4/1961 | Barenyi | 180/90 |
| 3,341,248 | 9/1967 | Barenyi et al. | 180/90 |
| 4,362,319 | 12/1982 | Mosaki et al. | 280/779 |

Primary Examiner—Joseph F. Peters, Jr.
Assistant Examiner—Ross Weaver
Attorney, Agent, or Firm—Parkhurst & Oliff

[57] ABSTRACT

A steering assembly supporting device comprising a steering assembly supporting body spaced from and extending in parallel to the cowl inner panel. The steering assembly supporting body comprises a hollow tubular portion and a hollow expanding portion having a cross-sectional area which is larger than that of the hollow tubular portion. The inner ends of the hollow tubular portion and the hollow extending portion are interconnected to each other. The other ends of the hollow tubular portion and the hollow expanding portion are fixed onto the corresponding cowl side panels. The steering assembly is supported by the hollow expanding portion.

10 Claims, 8 Drawing Figures

STEERING ASSEMBLY SUPPORTING DEVICE OF A MOTOR VEHICLE

BACKGROUND OF THE INVENTION

The present invention relates to a steering assembly supporting device of a motor vehicle.

The body of a motor vehicle normally comprises cowl side panels extending forward from the front ends of corresponding front door opening flanges, a cowl inner panel arranged to extend between the cowl side panels at a position beneath a wind shield, and a dash panel separating a driver's compartment from an engine compartment. In addition, in a motor vehicle, the tip of a steering tube passes through the dash panel and extends to the inside of the engine compartment. In such a motor vehicle, the steering tube, used to support a steering shaft, is normally supported in such a way that the intermediate portion of the steering tube is fixed onto both the cowl inner panel and the dash panel via a steering support and that the steering tube is fixed onto the dash panel at a position wherein the steering tube passes through the dash panel. However, in the case wherein the steering tube is supported as mentioned above, since the distance between the rear end of the steering support, which supports the steering tube and the front end of the steering support, at which site the steering support is fixed onto the cowl inner panel, is very long, when a motor vehicle is driven at a high speed or on a rough load, a problem occurs in that the steering wheel vibrates.

Swedish Patent publication No. 406303 discloses a steering assembly supporting device which comprises a steering assembly supporting member extending in parallel to and spaced from the cowl inner panel. The opposite ends of the steering assembly supporting member are fixed into the corresponding cowl side panels, and the steering assembly is supported by the intermediate portion of the steering assembly supporting member. This steering assembly supporting member has a hollow tubular construction over the entire length thereof and comprises U-shaped cross-sectional member and a flat member which are welded to each other. In addition, this steering assembly supporting member is so formed that the central portion thereof has a large cross-section and the opposite end portions thereof have a small cross-section, and the steering assembly is supported by one of the opposite end portions of the steering assembly supporting member. However, in this prior art, since the steerng assembly supporting member is formed so as to extend between the cowl side panels, the length of the steering assembly supporting member is very long. Consequently, in the case wherein the steering assembly supporting member is formed over the entire length thereof by the U-shaped cross-sectional member and the flat member which are welded to each other as mentioned above, since a high degree of accuracy is required regarding the size of the U-shaped cross-sectional member and the flat member, a problem occurs in that the manufacturing cost of the steering assembly supporting member is increased. In addition, in the case wherein the steering assembly supporting member has a welding construction over the entire length thereof, another problem occurs in that the steering assembly supporting member will be heavy. On the other hand, the rigidity of the steering assembly supporting member portion which is located between the steering assembly and the cowl side panel which is located near the steering assembly has a great influence on vibration of the steering assembly supporting member. However, in the above-mentioned prior art, the above-mentioned steering assembly supporting member portion has a small cross-section as mentioned above and, thus, since the degree of rigidity of the steering assembly supporting member portion is small, a problem occurs in that the steering wheel will vibrate when a motor vehicle is driven at a high speed or on a rough load.

In addition, German laid open Patent publication No. 2746183 discloses a steering assembly supporting device in which the steering assembly supporting member is formed by a hollow tube. In the case wherein the steering assembly supporting member is formed by a hollow tube as mentioned above, there is an advantage in that the weight of the steering assembly supporting member is reduced. However, in this case, since the degree of rigidity of the steering assembly supporting member is small, a problem occurs in that the steering wheel will vibrate when a motor vehicle is driven at a high speed or on a rough load. If the cross-sectional area of the hollow tube is increased, it is possible to prevent the steering assembly supporting member from vibrating. However, if the cross-sectional area of the hollow tube is increased, the weight of the steering assembly supporting member is increased, and the size of the driver's compartment is reduced. Consequently, it is genuinely difficult to increase the cross-sectional area of the hollow tube.

SUMMARY OF THE INVENTION

An object of the present invention is to provide a lightweight steering assembly supporting device which can be easily manufactured and is capable of preventing the steering wheel from vibrating.

According to the present invention, there is provided a steering assembly supporting device of a motor vehicle comprising a steering assembly, a floor, front door opening flanges, first and second cowl side panels each extending forward from a front end of the corresponding front door opening flange, front pillars each forming a portion of the corresponding front door opening flange and having a root portion connected to the corresponding cowl side panel, and a cowl inner panel spaced from the floor and transversely extending substantial in parallel to the floor at a position above the floor, wherein the steering assembly supporting device comprises a steering assembly supporting body spaced from the cowl inner panel and transversely extending substantially in parallel to the cowl inner panel, said steering assembly supporting body comprising a hollow tubular portion which has an inner end and an outer end fixed onto the first cowl side panel, and a hollow expanding portion which supports the steering assembly and has an inner end and an outer end fixed onto the second cowl side panel, the inner end of the hollow tubular portion being fixed onto the inner end of the hollow expanding portion, the hollow expanding portion having a cross-sectional area which is larger than that of the hollow tubular portion over the entire length of the hollow expanding portion.

The present invention may be more fully understood from the description of a preferred embodiments of the invention set forth below, together with the accompanying drawings.

DESCRIPTION OF PREFERRED EMBODIMENTS

Figure 1:
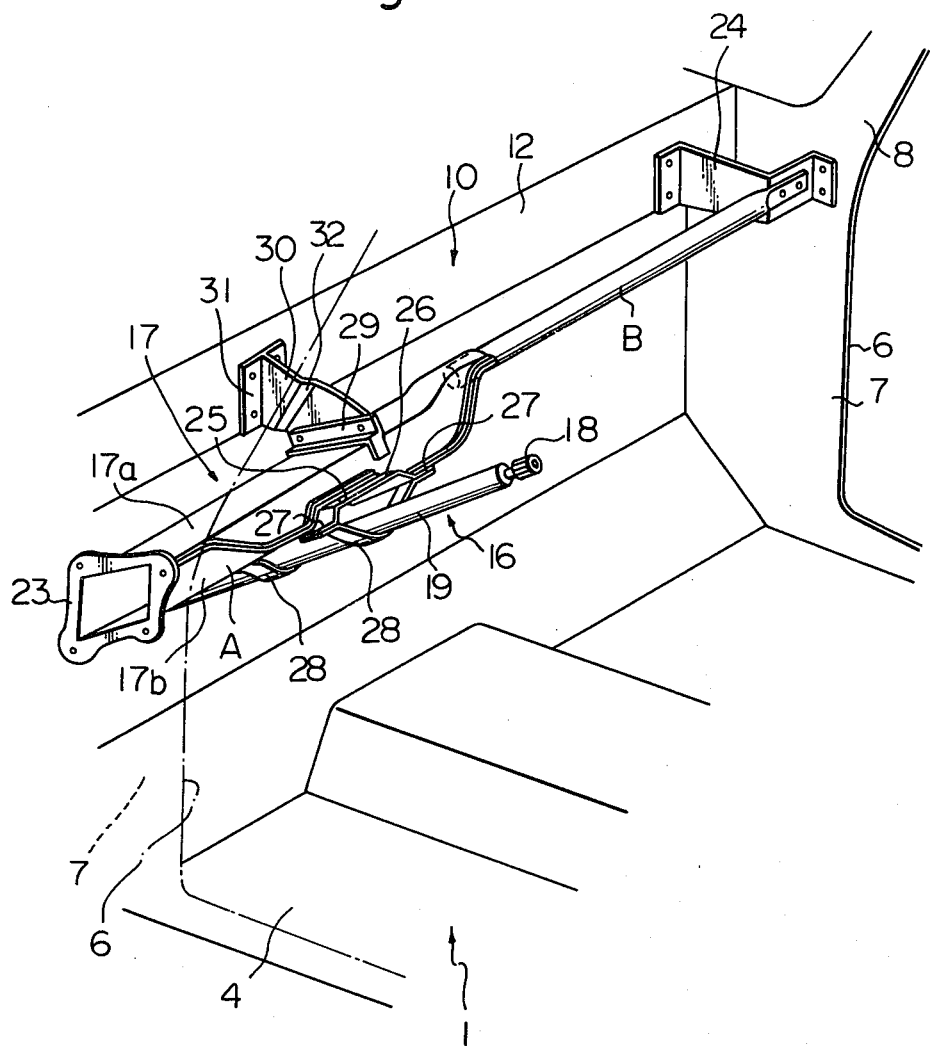
FIG. 1 is a perspective view of the interior of the driver's compartment of a motor vehicle.
Figure 2:
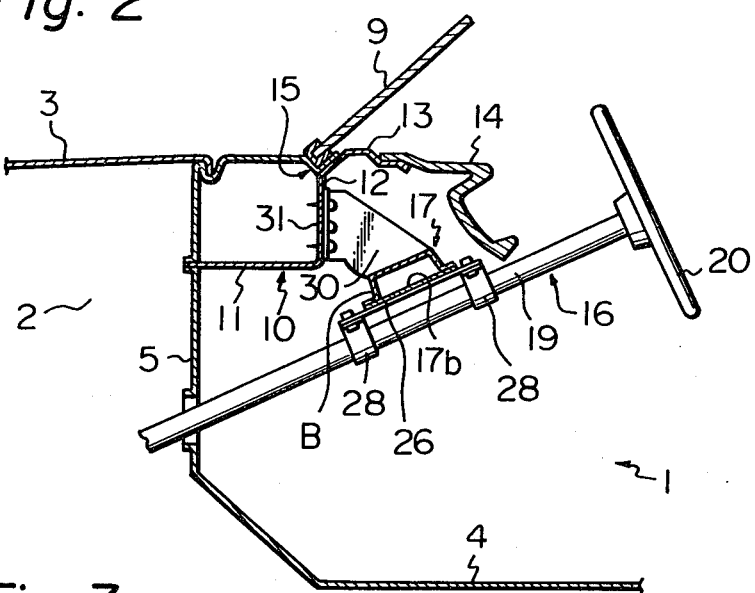
FIG. 2 is a cross-sectional side view of FIG. 1.
Figure 3:
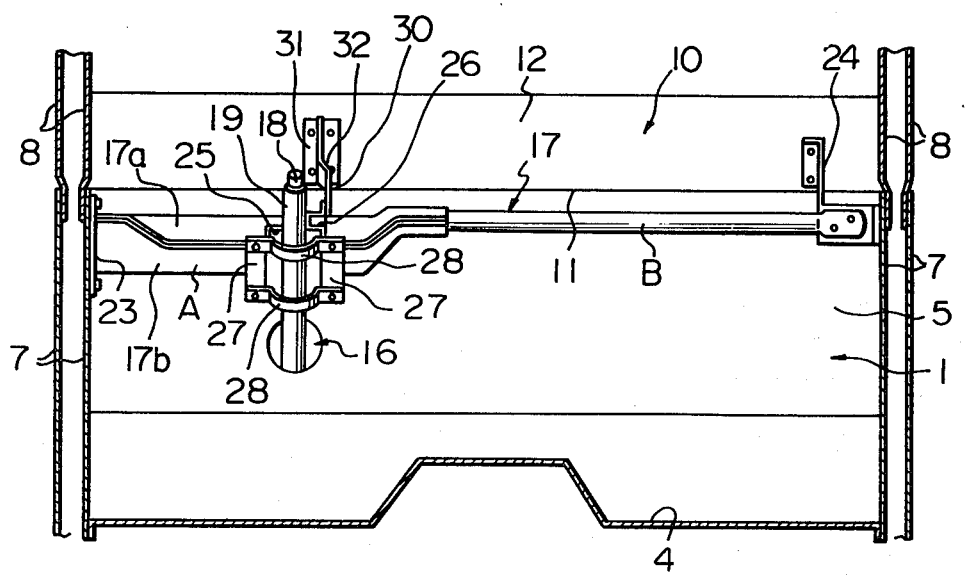
FIG. 3 is a front view of FIG. 1.
Figure 4:
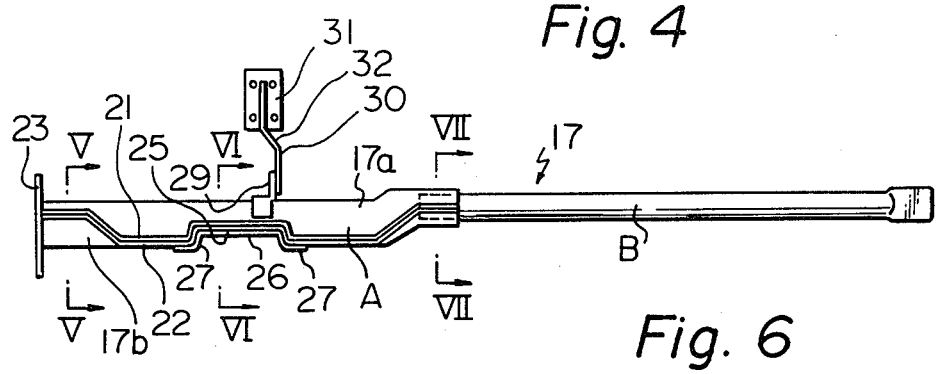
FIG. 4 is a front view of a steering assembly supporting body according to the present invention.
Figure 5:
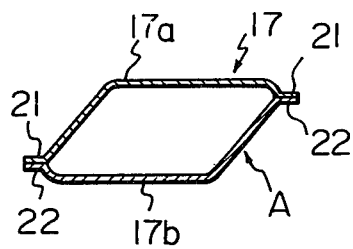
FIG. 5 is a cross-sectional view taken along the line V—V in FIG. 4.
Figure 6:
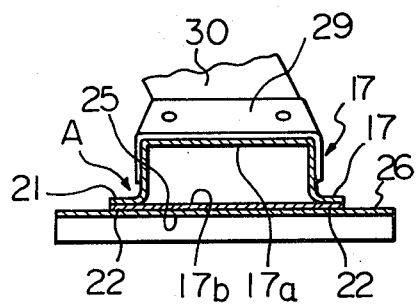
FIG. 6 is a cross-sectional view taken along the line VI—VI in FIG. 4.
Figure 7:
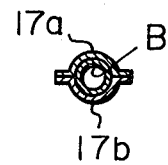
FIG. 7 is a cross-sectional view taken along the line VII—VII in FIG. 4.

Referring to FIGS. 1 through 3, 1 designates a driver's compartment, 2 an engine compartment, 3 an engine hood and 4 a floor; 5 designates a vertically extending dash panel separating the driver's compartment 1 from the engine compartment 2, 6 front door opening flanges, 7 cowl side panels, each extending forward from the front end of the corresponding front door opening flange 6, 8 front pillars, each forming a portion of the corresponding front door opening flange 6 and supporting the roof (not shown) of a motor vehicle, and 9 designates a wind shielding glass. A cowl inner panel 10 is arranged to extend between the cowl side panels 7. As illustrated in FIG. 2, the cowl inner panel 10 comprises a bottom wall 11 extending substantially in parallel to the floor 4, a side wall 12 vertically extending upwards from the rear end of the bottom wall 11 and an extension wall 13 extending backwards from the upper end of the side wall 12. A dash board 14 is mounted on the rear end of the extension wall 13. The front end of the bottom wall 11 of the cowl inner panel 10 is fixed onto the top end of the dash panel 5, and the bottom end of the wind shield 9 is supported on a bending portion 15 located between the side wall 12 and the extension wall 13. As illustrated in FIGS. 1 through 3, a steering assembly 16 and a steering assembly supporting body 17 are arranged within the driver's compartment 1. The steering assembly 16 comprises a steering shaft 18, a steering tube 19 enclosing the steering shaft 18 and supporting it, and a steering wheel 20 fixed onto the end of the steering shaft 18. The steering assembly supporting body 17 comprises a hollow expanding portion A extending in parallel to the cowl inner panel 10 in the rear of and beneath the cowl inner panel 10 and having a length which is slightly shorter than one half of the length of the steering assembly suporting body 17, and a hollow tubular portion B having a length which is slightly longer than one half of the length of the steering assembly supporting body 17. As illustrated in FIGS. 1 through 6, the hollow expanding portion A of the steering assembly supporting body 17 comprises a pair of outwardly expanding members 17a and 17b. The member 17a has a pair of outwardly extending flanges 21 (FIG. 5), and the member 17b has a pair of outwardly extending flanges 22 (FIG. 5). The flanges 21 of the member 17a are fixed onto the corresponding flanges 22 of the member 17b by a spot-welding or an arc welding operation. In addition, an annular shaped flange 23 is formed on the outer end of the hollow expanding portion A and is fixed onto the cowl side panel 7 by a welding operation or by means of bolts at the root portion of the front pillar 8. The cross-sectional area of the hollow expanding portion A is reduced to a size which is equal to the outer diameter of the hollow tubular portion B at the inner end of the hollow expanding portion A. The hollow tubular portion B is formed by a hollow cylindrical pipe having a uniform cross-section over the entire length thereof, and the inner end of the hollow tubular portion B is fitted into and welded to the inner end of the hollow expanding portion A. The outer end of the hollow tubular portion B is pressed and flattened, and this flat outer end of the hollow tubular portion B is fixed onto an L-shaped bracket 24 by means of bolts or is welded to the L-shaped bracket 24. The rear end of the L-shaped bracket 24 is fixed onto the cowl side panel 7 by means of bolts or is welded to the cowl side panel 7 at the root portion of the front pillar 8, and the front end of the L-shaped bracket 24 is fixed onto the side wall 12 of the cowl inner panel 10 by means of bolts or is welded to the side walls 12 of the cowl inner panel 10. The hollow expanding portion A has a cross-sectional area which is considerably larger than that of the hollow tubular portion B, and the hollow expanding portion A is so formed that it has a moment of inertia of area which is more than five times that of the hollow tubular portion B over the entire length of the hollow expanding portion A except for the inner end thereof.

A recessed portion 25 is formed on the lower wall of the member 17b of the hollow expanding portion A at a position above the steering tube 19, and a steering support 26, having a dish-shaped cross-section, is welded onto the recessed portion 25. The steering support 26 comprises a pair of flanges 27, each extending outwards from the lower end of the steering support 26 and projecting forward and backward from the hollow expanding portion A. A pair of spaced brackets 28 is fixed onto the steering tube 19 and onto the projecting portions of the flanges 27, which project forward and backward from the hollow expanding portion A by means of bolts. A flange 29 having an L-shaped cross-section is welded to the upper wall of the hollow expanding portion A at a position above the steering tube 19, and a bracket 30 is fixed onto the flange 29 by means of bolts or is welded to the flange 29. A mounting flange 31 is formed in one piece on the forward end of the bracket 30, and the mounting flange 31 is fixed onto the side wall 12 of the cowl inner panel 10 by means of bolts or is welded to the side wall 12 of the cowl inner panel 10. In addition, a step portion 32 is formed on the bracket 31.

Figure 8:
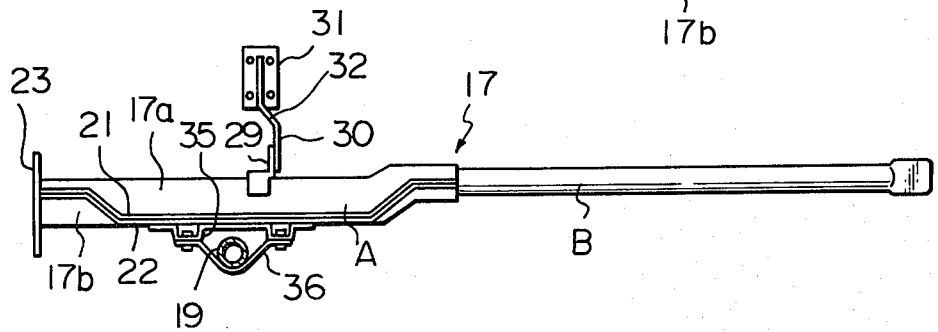
FIG. 8 is a front view of an alternative embodiment of a steering assembly supporting body according to the present invention.

FIG. 8 illustrates an alternative embodiment. In this embodiment, the hollow expanding portion A has a flat bottom wall, and a steering support 35 is welded to the flat bottom wall of the hollow expanding portion A. In addition, a pair of brackets 36, fixed onto the steering tube 19, is fixed onto the steering support 35 by means of bolts. In this embodiment, it is not necessary to form a recessed portion on the bottom wall of the hollow expanding portion A, as illustrated by reference numeral 25 in FIG. 4, and, therefore, there is an advantage in that the steering assembly suporting body 17 can be more easily manufactured than can the steering assembly supporting body 17 illustrated in FIG. 4.

According to the present invention, steering assembly supporting body 17, which is located between the steering assembly 16 and the cowl side panel 7 located near the steering assembly 16, is formed by the hollow expanding portion A having a large cross-sectional area and a high degree of rigidity. Consequently, it is possible to prevent the steering assembly 16 from vibrating when a motor vehicle is driven at a high speed or on a rough load. In addition, since the members 17a, 17b have a relatively short length, even if the degree of accuracy in the size of the members 17a, 17b is not high, the members 17a, 17b can be easily and assuredly welded to each other. Furthermore, since a portion of the steering assembly supporting body 17, that is, the hollow tubular portion B, is formed by a cylindrical pipe, it is possible to easily manufacture the steering assembly supporting body 17 and reduce the weight of the steering assembly supporting body 17.

While the invention has been described by reference to specific embodiments chosen for purposes of illustration, it should be apparent that numerous modifications could be made thereto by those skilled in the art without departing from the spirit and scope of the invention.

We claim:

1. A steering assembly supporting device of a motor vehicle comprising a steering assembly, a floor, front door opening flanges, first and second cowl side panels each extending forward from the front end of a corresponding front door opening flange, front pillars each forming a portion of the corresponding front door opening flange and having a root portion connected to a corresponding cowl side portion, and a cowl inner panel spaced from the floor and transversely extending substantially parallel to the floor at a position above the floor, wherein the steering assembly supporting device comprises:
   a steering assembly supporting body spaced from the cowl inner panel and transversely extending substantially parallel to the cowl inner panel, said steering assembly supporting body comprising a hollow tubular portion having an inner end and an outer end, a hollow expanded portion supporting the steering assembly having an inner end and an outer end, a L-shaped bracket having a first and second leg, the inner end of said hollow tubular portion being secured to the inner end of said hollow expanded portion, the outer end of said hollow expanded portion being secured to said second cowl side panel, the outer end of said hollow tubular portion being flattened and fixedly secured to the first leg of said L-shaped bracket, said first leg of said L-shaped bracket being fixedly secured to said first cowl side panel and the second leg of said L-shaped bracket being fixedly secured to said cowl inner panel, said hollow expanded portion having a cross-sectional area which is larger than that of said hollow tubular portion over the entire length of said hollow expanded portion.

2. A steering assembly supporting device according to claim 1, wherein the hollow expanded portion has a moment of inertia of area which is more than five times that of the hollow tubular portion.

3. A steering assembly supporting device according to claim 1, wherein the hollow tubular portion is made of a cylindrical hollow tube.

4. A steering assembly supporting device according to claim 1, wherein the first leg of said L-shaped bracket is fixed onto the first cowl side panel at the root portion of the corresponding front pillar.

5. A steering assembly supporting device according to claim 1, wherein the hollow expanded portion comprises a first outwardly expanding member having a pair of outwardly extending flanges, and a second outwardly expanding member having a pair of outwardly extending flanges, each being welded to the corresponding flange of the first outwardly expanding member.

6. A steering assembly supporting device according to claim 1, wherein the outer end of said hollow expanded portion is fixed onto the second cowl side panel at the root portion of the corresponding front pillar.

7. A steering assembly supporting device according to claim 1, wherein said device further comprises a bracket extending backward from the cowl inner panel and having a rear end and a front end fixed onto the cowl inner panel, the said rear end being connected to the hollow expanded portion.

8. A steering assembly supporting device according to claim 7, wherein said bracket has a transversely extending stop portion formed thereon.

9. A steering assembly supporting device according to claim 1, wherein said steering assembly supporting body further comprises a steering support fixed onto the hollow expanded portion and supporting thereof a steering tube of the steering assembly.

10. A steering assembly supporting device according to claim 9, wherein said support comprises a front end extending foward from the hollow expanded portion and a rear end extending backward from the hollow expanding portion, the steering tube being supported by both the said front end and said rear end of said support.

* * * * *